March 20, 1956     W. F. STREMKE, JR     2,738,821
CROSS-CHAIN WITH IMPROVED FASTENING MEANS
Filed May 25, 1953
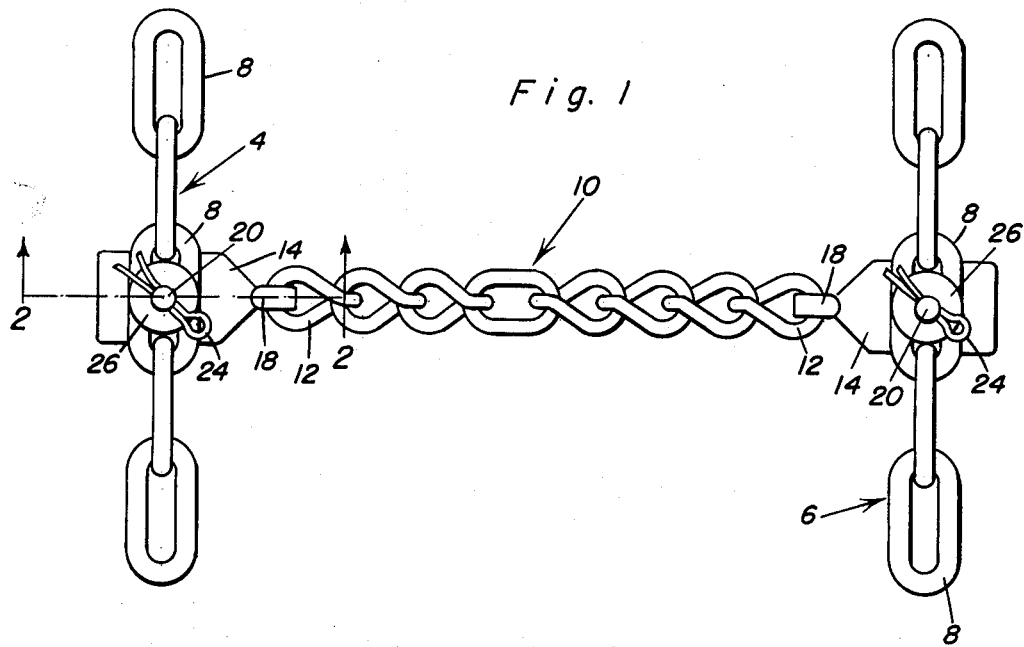
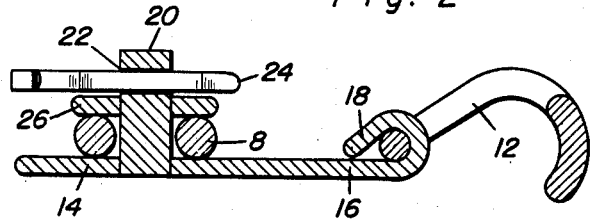
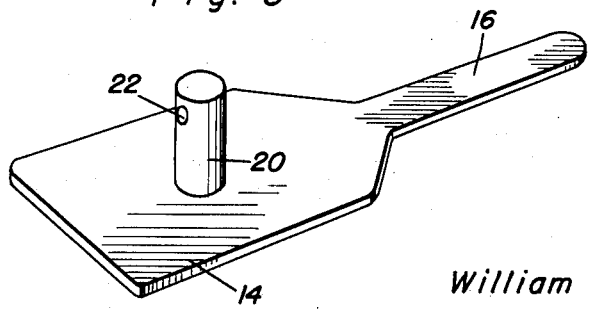
William F. Stremke, Jr.
INVENTOR.

United States Patent Office 2,738,821
Patented Mar. 20, 1956

2,738,821

CROSS-CHAIN WITH IMPROVED FASTENING MEANS

William F. Stremke, Jr., Milwaukee, Wis.

Application May 25, 1953, Serial No. 357,010

1 Claim. (Cl. 152—241)

The present invention relates to certain new and useful improvements in antiskid tire chains and has more particular reference to a chain construction characterized by a pair of circumferential side chains and a plurality of circumferentially spaced transverse cross-chains wherein the endmost links of the cross-chains are separably fastened to the side chains for ready and convenient replacement or repair, as the case may be.

An object of the invention is to provide novel fasteners for the respective endmost links of the cross-chains and to separably fasten said endmost links to the regular or standard links of the circumferential side chains by way of simple, practical and reliable means.

It will be evident from the preceding description that it is admittedly old in the art to utilize linking fasteners between the endmost links of a cross-chain and link structure of the side chains. It has been the practice, however, to provide some type of a special element which is incorporated in the link arrangement of the side chains, thus making it necessary to provide specially constructed side chains. The present invention is such that it dispenses with the use of special anchoring links or equivalent elements in the side chains and employs the more or less standard links throughout the circumference of each side chain, the only changed construction being in respect to the fasteners which are carried by the endmost links of the cross-chain for connective and retentive association with the standard links of said side chains.

Briefly, the objective desired is had through the medium of fastening means at each end of the cross-chain which means is characterized by a flat plate having a stud to pass through the side chain link with said stud equipped with a readily insertable and removable cotter key and said plate having a tang which is formed into a hook and thus joined with the cooperating endmost link of the cross-chain.

Other objects, features and advantages will become more readily apparent from the following description and the accompanying sheet of drawings.

In the accompanying drawings wherein like numerals are employed to desigate like parts throughout the views:

Figure 1 is a plan view showing a single cross-chain and fragmentary portions of side chains and illustrating the improved fasteners for the respective ends of the cross-chain.

Figure 2 is an enlarged view in section and elevation taken approximately on the plane of the line 2—2 of Figure 1 showing the cotter key in elevation and at a convenient angle for illustrative purposes.

Figure 3 is an enlarged perspective view of the aforementioned linking plate.

Referring now to the drawings with the aid of reference numerals and lead lines, the regular or conventional type circumferential side chains are denoted by the numerals 4 and 6 and these are made up of more or less standard links 8—8. It is not desired in the instant situation to change the construction of the side chains as is clear.

The cross-chain is denoted by the numeral 10. In practice, any number of attachable and detachable transverse or cross-chains will, of course, be utilized. Here again, the cross-chains are of customary or conventional form and only the endmost links 12—12 are here involved. That is to say, these endmost links are separably connected with adjacent links 8—8 of the respective circumferential side chains 4 and 6. Quick separable attaching means is employed for the desired purpose. The means may be at a single end of the cross-chain but it is preferably at each end for efficient results. Since the fastening means is the same at each end a description of one will suffice for both and therefore the same reference numerals are employed. To this end, the aforementioned linking plate is substantially rectangular, flat and is denoted by the numeral 14 and has a relatively narrow extension or tang 16 at one end in the manner shown. The free end portion of the tang is bent upon itself to form an assembling and retaining hook which as shown at 18 in Figure 1 is fastened securely to the link 12. The plate is provided at its center with an integral upstanding cylindrical stud 20 of appropriate cross-section which extends through the opening in the coacting link 8, the same having a hole or passage 22 to accommodate an insertable and removable cotter key 24. There is a washer 26 on the stud and said washer is interposed between the cotter key and link 8 as best shown in Figure 2.

It will be clear that the significant purpose of the invention is to provide a simple, practical and economical cross-chain with fastener devices at its respective ends, each device being as herein disclosed. By reason of the construction employed obvious advantages will accrue to manufacturers and users including, of course, the highly desired factors of saving time and promoting convenience in applying and removing the cross-chains. When a cross-chain breaks it is necessary only to remove two cotter pins and the washers to take out the broken chain and to thus enable the drive to either remove only broken links in the chain make up or to leave the rest of the chain intact, or to replace the broken cross-chain with an entirely new unit having fasteners. In many instances the fasteners herein disclosed may be salvaged even when it is necessary to throw away the whole or greater portion of a damaged cross-chain. The construction shown is such that the cross-chains can be inserted and removed by the automobile owner with the chain actually remaining on the wheel.

Since numerous modifications and changes will readily occur to those skilled in the art, it is not desired to limit the invention to the exact construction shown and described, and accordingly all suitable modifications and equivalents may be resorted to, falling within the scope of the invention claimed.

What is claimed as new is as follows:

As a new article of manufacture, a repair type cross chain readily applicable and removable from between a pair of complemental circumferential side chains, said cross chain comprising a plurality of conventional-type interconnected companion links, the endmost links being of endless loop form, a pair of duplicate cross chain fasteners, one fastener for each endmost link, each fastener comprising a substantially flat imperforate plate which, when in use, is directly superimposed against one face of a selected cooperating link on said side chain and having a width less than the length of said cooperating link, said plate having a centrally positioned, laterally projecting, integral, non-threaded stud of a length adapted to extend through and beyond the opening in said cooperating link, a washer encircling said stud, said stud having a cotter key hole therein, a cotter key fitted removably in said hole so that said cooperating link is adapted to be removably sandwiched between said plate and washer, said plate being provided at the inner end thereof with an integral, relatively narrow, bendable tongue extending through the loop in said endmost link of the cross chain and being clinched thereto.

References Cited in the file of this patent

UNITED STATES PATENTS

| | | |
|---|---|---|
| 2,424,940 | Muise | July 29, 1947 |
| 2,438,248 | Madison | Mar. 23, 1948 |
| 2,444,462 | Morton | July 6, 1948 |
| 2,657,727 | Peterson | Nov. 3, 1953 |

FOREIGN PATENTS

| | | |
|---|---|---|
| 86,268 | Sweden | May 5, 1936 |